US006950374B2

(12) United States Patent
McKay

(10) Patent No.: US 6,950,374 B2
(45) Date of Patent: *Sep. 27, 2005

(54) TIMEKEEPING AND MAGNIFYING DEVICE

(76) Inventor: Christopher B. McKay, 24806 Handley Dr., Carmel, CA (US) 93923

(*) Notice: Subject to any disclaimer, the term of this patent is extended or adjusted under 35 U.S.C. 154(b) by 55 days.

This patent is subject to a terminal disclaimer.

(21) Appl. No.: 10/289,154

(22) Filed: Nov. 5, 2002

(65) Prior Publication Data

US 2004/0151077 A1 Aug. 5, 2004

Related U.S. Application Data

(63) Continuation of application No. 09/139,211, filed on Aug. 24, 1998, now Pat. No. 6,480,441, which is a continuation-in-part of application No. 09/002,802, filed on Jan. 5, 1998, now Pat. No. 5,883,860, which is a continuation of application No. 08/519,294, filed on Aug. 24, 1995, now Pat. No. 5,706,255.

(51) Int. Cl.[7] .......................... G04B 47/00; G02B 27/02

(52) U.S. Cl. .......................... 368/10; 368/67; 368/278; 359/809; 359/815

(58) Field of Search .............................. 368/10, 67, 76, 368/80, 227, 276–283; 359/802, 804, 809–815

(56) References Cited

U.S. PATENT DOCUMENTS

| | | | | |
|---|---|---|---|---|
| 1,523,158 A | | 1/1925 | Angeletti | |
| 2,679,785 A | | 6/1954 | Batt | |
| 3,025,662 A | | 3/1962 | Fleishman et al. | |
| 3,140,579 A | | 7/1964 | Skakel, Jr. | |
| 3,444,685 A | | 5/1969 | Juillerat | |
| 4,451,117 A | | 5/1984 | Goode | |
| 4,972,394 A | | 11/1990 | DiMarco | |
| 4,991,935 A | | 2/1991 | Sakurai | |
| 5,065,373 A | | 11/1991 | Alcantara Maia | |
| 5,183,193 A | | 2/1993 | Brandell | |
| 5,548,565 A | * | 8/1996 | Aoyama et al. | 368/227 |
| 5,706,255 A | | 1/1998 | McKay | |
| 5,883,860 A | | 3/1999 | McKay | |

FOREIGN PATENT DOCUMENTS

| | | | |
|---|---|---|---|
| FR | 1205272 | | 8/1959 |
| FR | 2663134 | | 12/1991 |
| GB | 2296345 | * | 6/1996 |

* cited by examiner

*Primary Examiner*—Vit W. Miska
(74) *Attorney, Agent, or Firm*—Kolisch Hartwell, P.C.

(57) ABSTRACT

A timekeeping and magnifying device is disclosed. The device includes a watch and a magnifying lens pivotally connected to the watch. The lens may be pivoted away from the face of the watch to magnify objects other than the face of the watch. In one embodiment of the invention, the device includes spring structure which is adapted to bias the lens away from the face, and a fastener which selectively retains the lens adjacent the face of the watch until disengaged, at which point the spring structure automatically pivots the lens away from the face of the watch. In a variation of this embodiment, the fastener is actuated by a push-button mechanism. The device may further include a light that is actuated when the lens is pivoted away from the face of the watch, such as by the spring structure.

11 Claims, 4 Drawing Sheets

Fig. 6
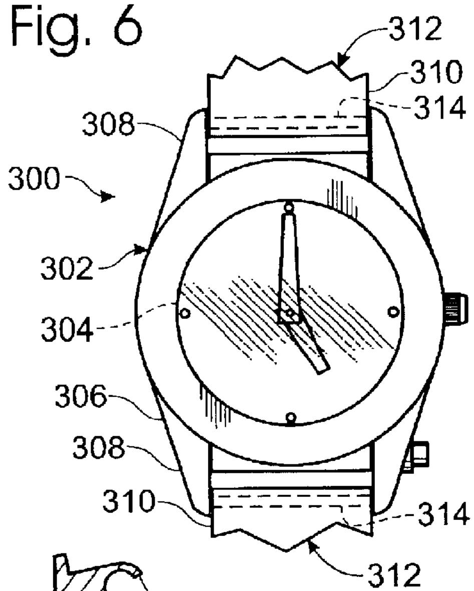
Fig. 7
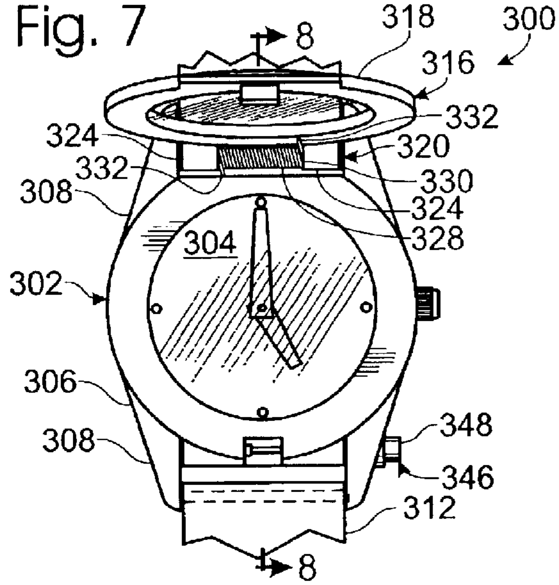
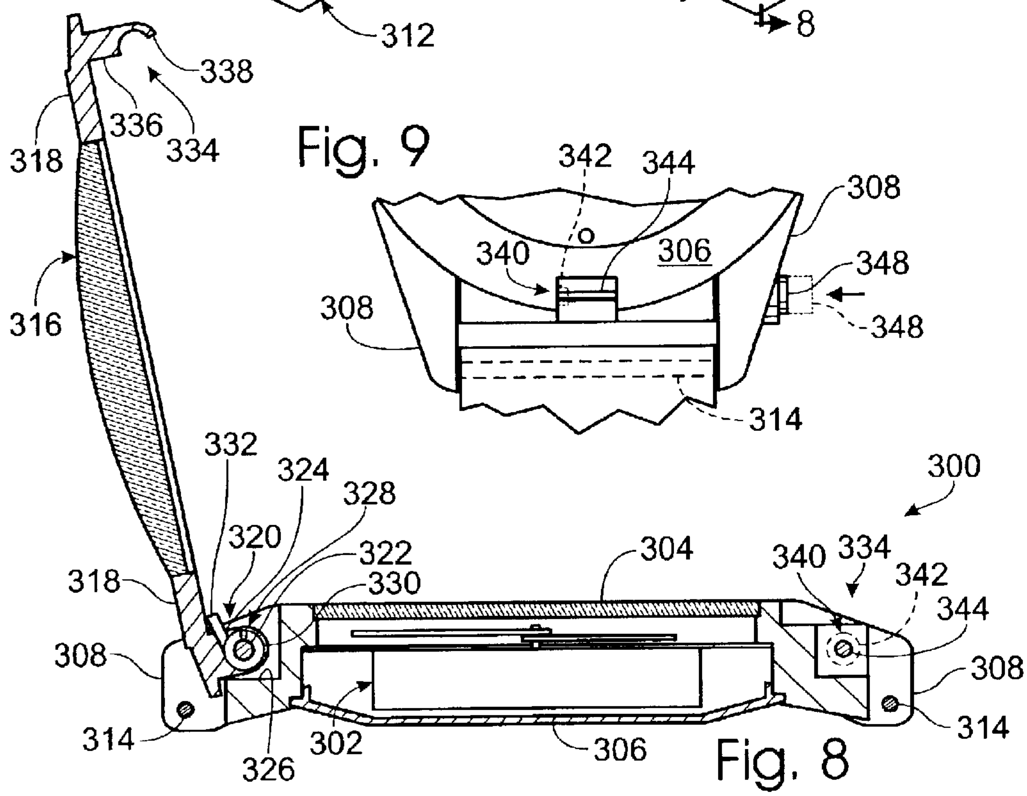
Fig. 8
Fig. 9
Fig. 10
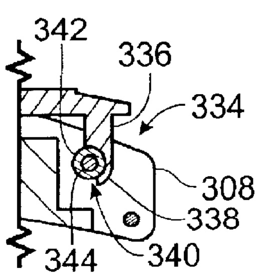
Fig. 11
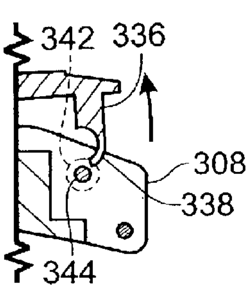

TIMEKEEPING AND MAGNIFYING DEVICE

RELATED APPLICATIONS

This application is a continuation patent application claiming priority to U.S. patent application Ser. No. 09/139,211, which was filed on Aug. 24, 1998, issued on Nov. 12, 2002 as U.S. Pat. No. 6,480,441, and which is a continuation-in-part of U.S. patent application Ser. No. 09/002,802, which was filed Jan. 5, 1998, issued on Mar. 16, 1999 as U.S. Pat. No. 5,883,860, and which is a continuation of U.S. patent application Ser. No. 08/519,294, which was filed Aug. 24, 1995 and issued on Jan. 6, 1998 as U.S. Pat. No. 5,706,255. The complete disclosures of the above-identified patents are hereby incorporated by reference for all purposes.

BACKGROUND OF THE INVENTION

This invention relates to timekeeping and magnifying devices. More particularly, it relates to a device containing a watch and a pivotally attached magnifying lens.

A watch is used for keeping time and generally includes a face and at least one digital and/or analog timekeeping structure. Other features which may be contained in a watch are a date-keeping mechanism, a stop watch, an alarm, a light, etc. A watch typically includes a band so that it can be worn on a user's wrist. Alternatively, a watch may be carried in a user's pocket or elsewhere.

A magnifying lens is used to enlarge the image of an object. People with poor eyesight often use a magnifying lens to see small objects or to read small print, such as newspaper text, prices, menu items, etc. Also, magnifying lenses often are used to inspect small objects, regardless of the user's eyesight. Children especially like to use magnifying lenses as educational devices for examining objects, such as rocks, insects, etc. People with poor vision often need both a watch and a magnifying lens. Additionally, people with poor vision often do not have a magnifying lens with them when they need to enlarge the image of an object so that it may be clearly seen. Therefore, the present invention is a timekeeping and magnifying device which combines both a watch and a magnifying lens.

SUMMARY OF THE INVENTION

The invented timekeeping and magnifying device includes a watch with a face and a magnifying lens. The magnifying lens is positioned adjacent the face of the watch. A hinge connects the magnifying lens with the watch and allows the magnifying lens to pivot away from the face so that a user may use the magnifying lens to magnify objects other than the face of the watch. In one embodiment of the invention, the device includes a spring structure which is adapted to bias the lens away from the face, and a fastener which selectively retains the lens adjacent the face of the watch until disengaged, at which point the spring structure automatically pivots the lens away from the face of the watch. In a variation of this embodiment, the fastener is actuated by a push-button mechanism. The device may further include a light that is actuated when the lens is pivoted away from the face of the watch, such as by the spring structure.

Various other features of the present invention will become fully apparent as the detailed description which follows is read with reference to the drawings briefly described below.

BRIEF DESCRIPTION OF THE DRAWINGS

FIG. 6 is a top plan view of another embodiment of the invention, with the magnifying lens in a closed position.

FIG. 7 is a top plan view of the device of FIG. 6, with the magnifying lens pivoted away from the face of the watch.

FIG. 8 is a cross-sectional view of the device of FIG. 7 taken along the line 8—8 in FIG. 7.

FIG. 9 is an enlarged detail showing a push-button mechanism for disengaging the fastener and allowing the lens to be pivoted away from the face of the watch.

FIG. 10 is a cross-sectional detail of the device of FIG. 6, with the lens retained adjacent the watch by the fastener.

FIG. 11 is the cross-sectional detail of FIG. 10 with the fastener disengaged and the lens pivoting away from the face of the watch.

DETAILED DESCRIPTION OF THE PREFERRED EMBODIMENTS

Figure 1:
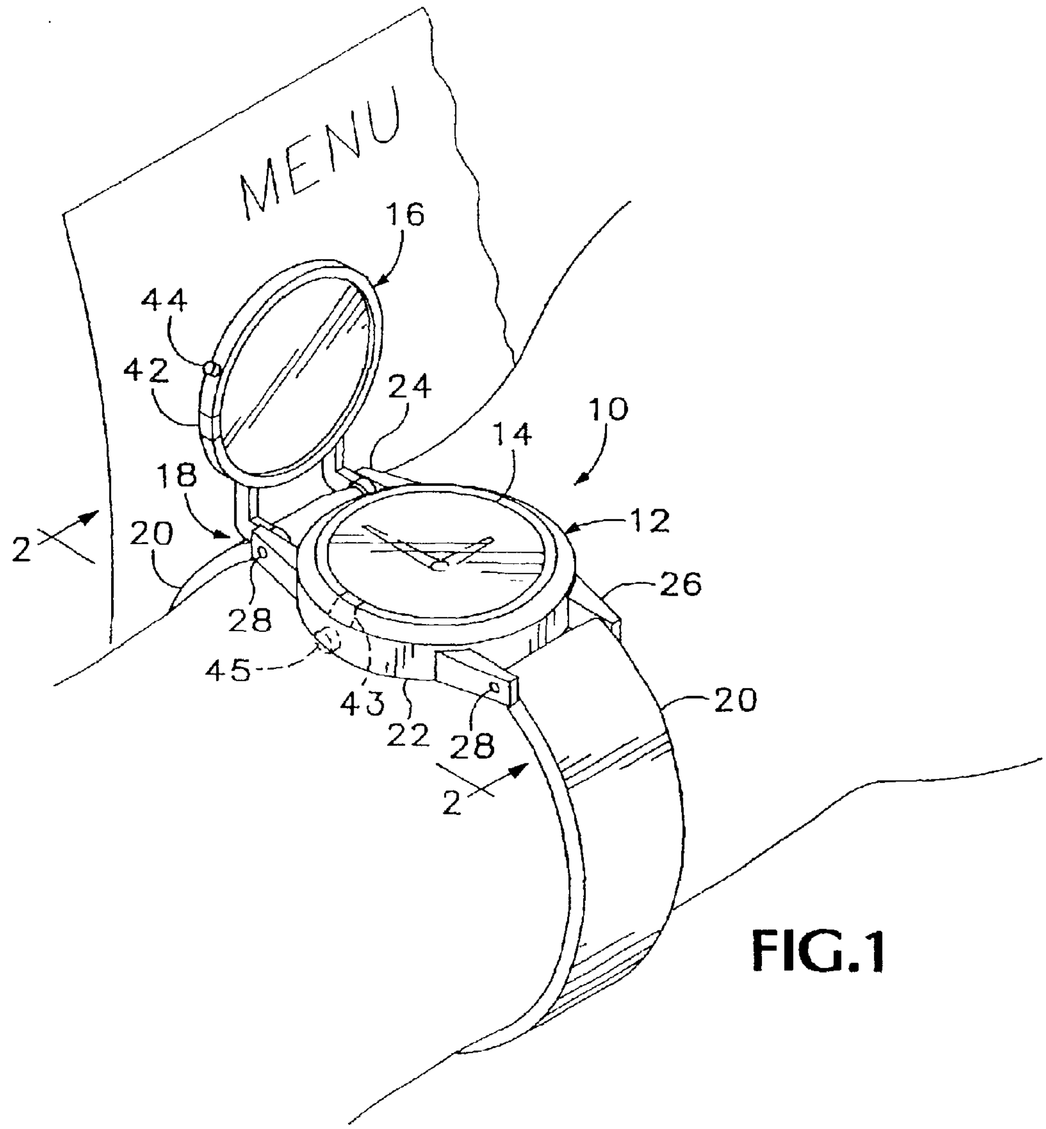
FIG. 1 is a view of the invented timekeeping and magnifying device being worn on a user's wrist and used to magnify a portion of a menu.

Referring now to the drawings, FIG. 1 depicts the timekeeping and magnifying device of the invention, indicated generally at 10. As shown in FIG. 1, the device 10 is being worn on a user's wrist and used to magnify a portion of a menu. The device 10 includes a watch 12 and a magnifying lens 16. The watch 12 further includes a face 14 and a housing 22 adjacent the face 14. A hinge 18 pivotally connects the magnifying lens 16 with the watch 12 and allows the magnifying lens 16 to pivot away from the face 14 so that a user may use the lens 16 to magnify objects. The hinge 18 allows the magnifying lens 16 to pivot from an "at rest" position, where it is adjacent to and substantially parallel to the face 14, to an "in use" position, where it is pivoted sufficiently away from the face 14 to allow the user to view the magnified image of an object. Preferably, the angle formed between the face 14 and the lens 16 when the lens 16 is in its "in use" position is between approximately 90° and approximately 180°, however, angles outside of this range are also acceptable. When the lens 16 is in its "at rest" position, the face 14 of the watch 12 is magnified.

As shown in FIG. 1, the watch 12 is a conventional analog wrist watch. It should be understood that the present invention may be practiced using any form of digital and/or analog wrist watch, pocket watch, or other form of watch. As stated, the watch 12 includes a face 14, and, as shown in FIG. 1, the face 14 is circular. It should be understood that the face 14 can be of any geometric shape. The face 14 is formed of a transparent material, such as glass or clear plastic. Additionally, the face 14 may be coated with an anti-reflective or scratch-resistant coating.

The watch 12 also contains a housing 22 adjacent the face 14. The housing 22 is formed of a suitable material, such as plastic or metal. In the preferred embodiment, the housing 22 includes opposed end regions 24 and 26. The end regions 24 and 26 each are designed to receive a pin 28.

Pins 28 connect each end region 24 and 26 of the housing 22 with an adjustable band 20, as is conventional with watches. The band 20 is designed to retain the device 10 around a user's wrist. The band 20 may be formed from a variety of materials, so long as it retains the device 10 around a user's wrist. Examples of suitable materials include, but are not limited to, fabric, metal, plastic, and leather. Preferably, the band 20 is adjustable so that the device 10 may be used on a variety of different-sized wrists. This adjustable characteristic also may be achieved by forming the band out of an elastomeric material. Alternatively, the band 20 comprises a plurality of interconnected sections which allow the band 20 to be selectively loosened or tightened, depending on a user's preference and wrist size.

Figure 2:
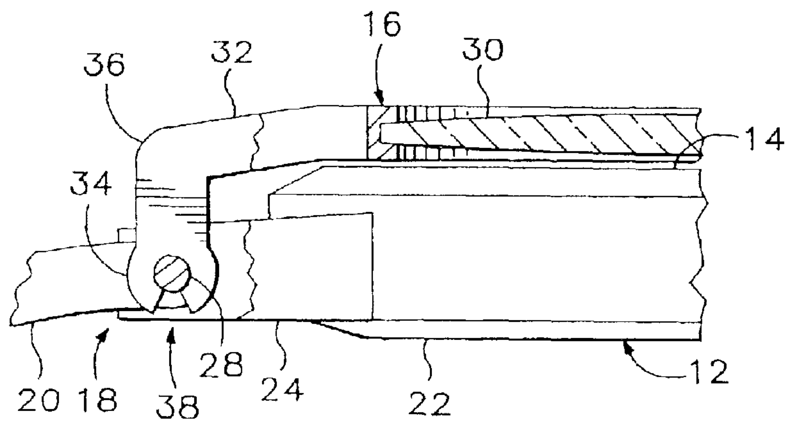
FIG. 2 is an enlarged cross-sectional view of the device shown in FIG. 1 taken generally along the line 2—2 in FIG. 1 with sections broken away and the magnifying lens pivoted to be in its "at rest" position.

The magnifying lens 16 is formed of a clear material, such as glass or clear plastic. Preferably, the lens 16 is sized to conform to the shape of the face 14, but it may take many shapes, including the shapes of animals or characters to attract the use of the device 10 by children. As shown in FIG. 2, the magnifying lens 16 comprises a convex portion 30 and a frame portion 32. The convex portion is shaped to provide a predetermined degree of magnification. Preferably, both sides of the lens 16 have convex surfaces. Other lens configurations are possible, including, but not limited to, a lens with a convex surface on only one side, a lens with a both a convex and a concave side, and a lens in which one side is substantially planar. Furthermore, the lens 16 could be a prescription eyeglass lens.

The frame portion 32 integrally includes a pin receiving portion 34 and an elbow bend 36. The elbow bend 36 connects the pin receiving portion 34 with the remainder of the frame portion 32 so that the pin receiving portion 34 is substantially perpendicular to the remainder of the frame portion 32. This configuration allows the pin receiving portion 34 to be connected to the pin 28 while also allowing the convex portion 30 of the lens 16 to be pivoted into its at rest position, where it is substantially parallel to and adjacent to the face 14.

As shown in FIG. 2, the pin receiving portion 34 substantially encircles the pin 28, except for a curved gap 38 which is defined by the pin receiving portion 34. The gap 38 enlarges as its distance from the pin 28 increases. This configuration allows the magnifying lens 16 to be easily detached from the device 10 by pulling the frame portion 32 away from the pin 28. Once detached, the lens 16, as depicted in dashed lines in FIG. 3, can be used to magnify the image of an object without requiring that the entire device 10 be positioned near the object. The design of the frame portion 32 allows the lens 16 to be easily reattached to the pin 28. Moreover, the lens 16 also can be pivoted about the pin 28 without detaching the lens 16 from the device 10.

A hinge 18 connects the magnifying lens 16 with the watch 12 and allows the lens 16 to pivot away from the face 14 so that a user may use the magnifying lens 16 to magnify objects. The hinge 18 may be any suitable device which pivotally connects two objects. In the preferred embodiment, the hinge 18 is comprised of one of the pins 28 which connects the band 20 to the housing 22 and the pin receiving portion 34 of the lens 16, as shown in FIG. 2. In this embodiment, the lens 16 is interposed between the band 20 and the housing 22.

Figure 3:
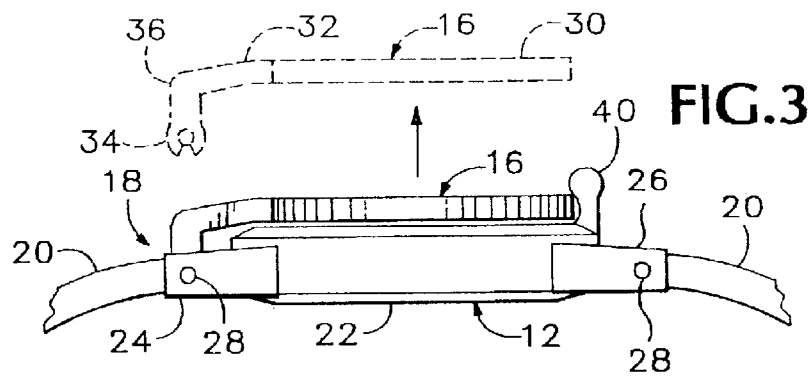
FIG. 3 is a side view of a second embodiment of the invention.

As shown in FIG. 3, the device 10 may contain a fastener 40 on the housing 22 which is designed to restrict the magnifying lens 16 from accidentally pivoting away from the face 14. The fastener 40 may be formed of any suitable durable material, such as metal or hard plastic, and may be of any suitable shape. Preferably, the fastener 40 is formed of the same material as the housing 22. As shown in FIG. 3, the fastener 40 has a generally spherical shape and is located on the housing 22 opposite the hinge 18. The fastener 40 frictionally holds the lens 16 adjacent the face 14 and is released by slightly deforming or bending the fastener 40 away from the lens 16. To use the magnifying lens 16, a user merely unfastens the lens 16 from the fastener 40 and pivots the lens 16 away from the face 14. Alternatively, the friction between the pin receiving portion 34 of the magnifying lens 16 and the pin 28 may perform this fastening function. Furthermore, the fastener 40 may comprise a plurality of units, at least one of which is located on the magnifying lens 16 and at least one of which is located on the watch 12. Those units cooperate to restrict the lens 16 from pivoting away from the face 14.

As shown in FIG. 1, the device 10 may also contain a light 42 adjacent the lens 16. The light 42 is close enough to the convex portion 30 of the lens 16 to illuminate the convex portion 30 and a region of space adjacent the convex portion 30 to allow the magnified image of the viewed object to be seen, even in dark areas. Alternatively, as shown in dashed lines in FIG. 1, the light may be contained in the housing 22 of the watch 12, as shown at 43 in FIG. 1. Light 42 is actuated by a button 44 on the lens 16, and light 43 is actuated by a button 45 on the watch 12.

Another embodiment of the invention includes the previously described watch 12 and lens 16, and further includes a connector which removably holds the magnifying lens 16 over the face 14 of the watch 12 and allows the magnifying lens 16 to be detached from the watch 12. The connector may, but does not necessarily, allow the lens 16 to pivot away from the face 12. The combination of the hinge 18 and fastener 40 depicted in FIG. 3 is an example of a connector which holds the lens 16 over the face 14. Alternatively, the hinge 18 itself may be an example of a connector if the friction between the pin 28 and the pin receiving portion 34 of the lens 16 is sufficient to hold the lens 16 over the face 14. Other variations of this connector exist. Examples of other variations include, but are not limited to, a plurality of prongs on the lens 16 which engage the watch 12 or the band 20, a plurality of magnets and magnetic materials on the lens 16 and the watch 12, and a compression fit between the lens 16 and the watch 12.

Figure 4:
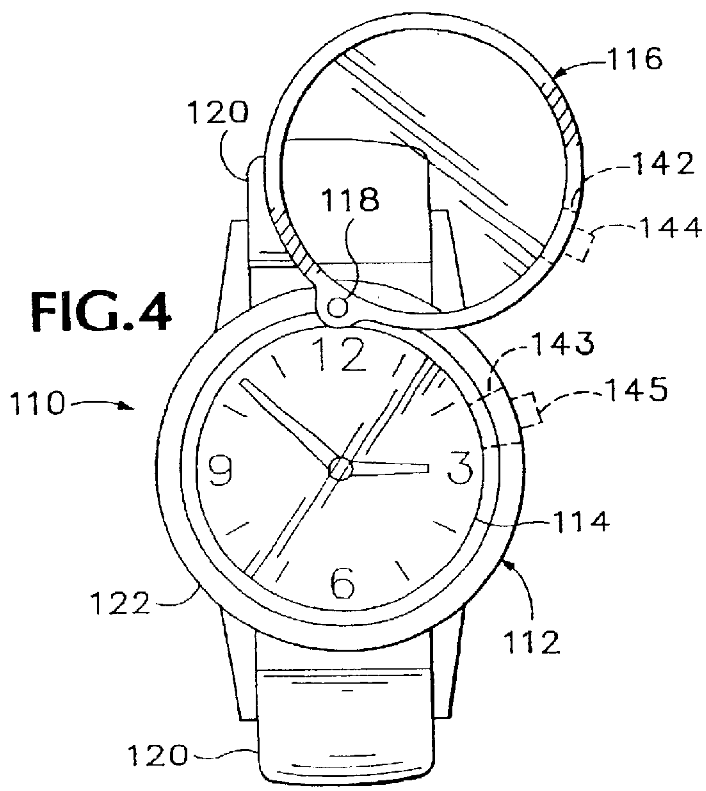
FIG. 4 is a top view of an alternate embodiment of the invention.

An alternate embodiment of the invention is shown in FIG. 4 and generally indicated at 110. In this embodiment, the device 110 still includes a watch 112 and a magnifying lens 116. The watch 112 includes a face 114 and a housing 122 which is connected to an adjustable band 120. Furthermore, this embodiment also may contain a light 142 adjacent the lens 116. The light 142 is actuated by a button 144 on the lens 116. Alternatively, the light and the button may be connected to the watch 112, as shown in dashed lines in FIG. 4 at 143 and 145 respectively. In this embodiment, the hinge is a pin 118 on the watch 112. The pin 118 allows the lens 116 to pivot rotationally in a plane substantially parallel to the face 114 of the watch 112.

Figure 5:
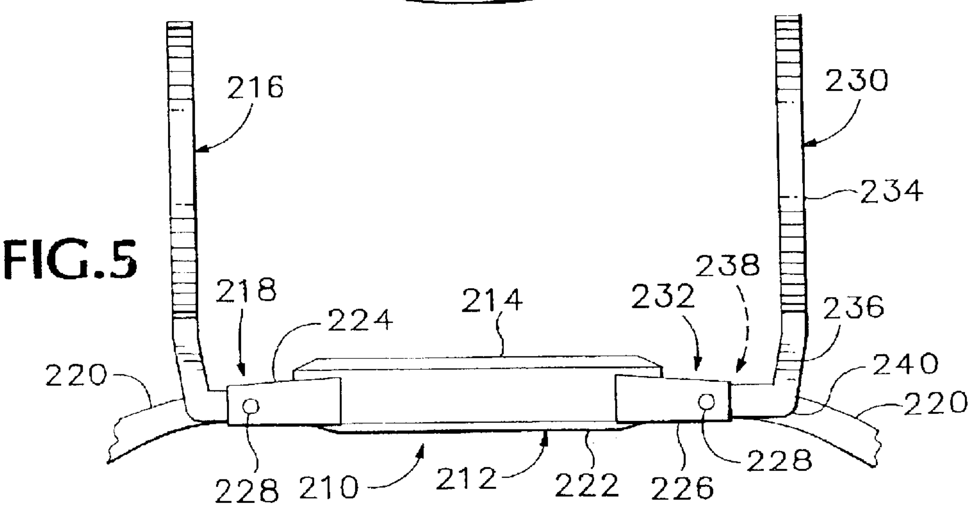
FIG. 5 is a side view of another embodiment of the invention with sections broken away.

FIG. 5 depicts a further embodiment of the invention. In this embodiment, the device 210 includes the same general components as the preferred embodiment, including, but not limited to a watch 212, a face 214, a housing 222 with opposed end regions 224 and 226, a magnifying lens 216, an adjustable band 220, pins 228, and a hinge 218. Additionally, this embodiment further includes a second magnifying lens 230 and a second hinge 232. The second magnifying lens 230 is substantially similar to and has the same subcomponents as the first magnifying lens 216, including, but not limited to, a convex portion 234 and a frame portion 236 which includes a pin receiving portion 238 and an elbow bend 240.

The second hinge 232 pivotally connects the second magnifying lens 230 with the watch 212 and allows the second magnifying lens 230 to pivot away from the face 214 of the watch 212. Preferably, the second hinge 232 is comprised of the pin receiving portion 240 of the second lens 230 and the pin 228 which connects the second end region 226 of the housing 222 with the band 220. The second hinge 232 connects the second magnifying lens 230 to the watch 212 in a location which permits the first and second magnifying lenses 216 and 230 to be substantially opposed when the lenses each are pivoted approximately 90° away from the face 214. In this position, the lenses 216 and 230 cooperate to create a telescope-like combination.

It is important that the distance between the pin receiving portion 238 and the elbow bend 240 of second magnifying lens 230 be greater than the distance between the corresponding portions 34 and 36 of the first magnifying lens 16. Otherwise, both lenses 216 and 230 could not be pivoted to be in “at rest” positions, where they are both generally parallel to and adjacent to the face 214. In this configuration, when the lenses 216 and 230 are both in their at rest positions, the first magnifying lens 216 will be intermediate the face 214 and the second magnifying lens 230.

Other variations of this embodiment are possible. As an example, the lenses 216 and 230 may be selected to have focal lengths which produce a microscope-like combination as opposed to a telescope-like combination. Additionally, it is possible that at least one of the lenses 216 and 230 contain at least one concave surface or at least one planar surface. Different combinations of convex, concave and planar lens surfaces enable the device to be utilized for a variety of different image-enhancing uses, including examining objects both close to the device and at a distance. This feature is particularly advantageous when the device is used by children as an educational device.

To use the device 10 shown in FIG. 1, the magnifying lens 16 must first be pivoted away from the face 14 of the watch 12 to its “in use” position. Preferably, this “in use” position is between approximately 90° and approximately 180° away from the face 14 of the watch 12, but angles outside of this range are also acceptable. Next, the lens 16 is positioned in a spaced relationship between the user’s eye and the object to be magnified. Once positioned, the lens 16 should be oriented to the user’s eye so that the magnifying lens is substantially perpendicular to the user’s line of sight. This provides the best magnified view of the object. Next, the user simply looks through the magnifying lens at the object to be magnified. Finally, the magnified image of the object is focused by adjusting the position of the magnifying lens 16 between the user’s eye and the object. Preferably, this involves moving the lens 16 forwardly or backwardly along the user’s line of sight while maintaining the perpendicular orientation of the lens 16.

If variations of the device shown in FIG. 1 are used, the pivoting step of the method for using the device 10 may contain additional procedures. When the device 10 contains a fastener 40, as shown in FIG. 3, the lens 16 must be unfastened from the fastener 40 before it can be pivoted away from the face 14. Furthermore, if the object to be magnified is located in a dark area, the light 42 adjacent the lens 16 should be used to illuminate the object.

Alternatively, the lens 16 may be removed from the watch 12 before being used to magnify the image of an object. As previously described, the preferred embodiment of the lens 16 allows the lens 16 to be pivoted about the hinge 18 or detached from the hinge 18. Once removed from the watch 12, the same method is followed as is described above.

Another embodiment of the invented timekeeping and magnifying device is shown in FIGS. 6-8 and indicated generally at 300. Unless otherwise indicated, device 300 includes the same components and subcomponents as the previously described devices. By referring to FIG. 6, it can be seen that device 300 includes a watch 302 having a face 304 and a housing 306 surrounding the face. Each end 308 of housing 306 is connected to an end 310 of a band 312. As shown, band 312 is connected to housing 306 with a pair of pins 314, although it is within the scope of the present invention that any suitable form of mechanical attachment may be used, such as bands that are integrally molded or otherwise formed with the housing, and bands that are connected via snaps, hook-and-loop structures, screws, deformable prongs, etc.

A magnifying lens 316 is pivotally connected to device 300. Lens 316 includes a perimeter 318, which may be the outer region of the lens or may be a protective band, such as shown in FIGS. 7 and 8. Lens 316 is pivotally connected to watch 302 by a hinge 320. It should be understood that hinge 320 may be any suitable structure for coupling lens 316 to watch 302 and enabling the lens pivot with respect to the watch. As shown in FIG. 8, hinge 320 includes a pin 322, which is mounted on end 308 of housing 306 and extends generally parallel to pins 312 and face 304. Lens 316 includes a pair of mounts 324 through which pin 322 extends to pivotally connect the lens to the watch.

Lens 316 is pivotal between a first, or closed, position, shown in FIG. 6, in which lens 316 is positioned adjacent and generally parallel to face 304, and a second position, shown in FIGS. 7 and 8, in which the lens is pivoted away from the face so that a user may use lens 316 to magnify or view objects other than the face. Although positions outside of this range may be acceptable as well, the second position is generally between approximately 70° and approximately 130° away from face 304, preferably between approximately 80° and approximately 120°, and more preferably between approximately 90° and 110° away from face 304, as shown in FIGS. 7 and 8. It should be understood that the preferred viewing angle will depend to some degree upon the preferences of the individual user, as well as the object or objects being viewed.

As shown, device 300 includes a stop 326 that extends from housing 306 to prevent lens 316 from pivoting more than a defined degree away from face 306. When lens 316 pivoted to the defined position, the perimeter of the lens engages stop 326, and thereby prevents lens 316 from being pivoted any further away from the face.

Device 300 further includes a spring structure 328 that is biased to pivot lens 316 away from face 304. As shown, spring structure 328 includes a coil spring 330 which extends around pin 322 and includes legs 332 that respectively engage housing 306 and lens 316 to bias the lens away from the closed position to a position away from the face, such as the second position shown in FIGS. 7 and 8. It should be understood that when lens 316 is pivoted from the second position to the closed position, spring structure 328 is compressed and therefore is biased to return to its uncompressed, or less compressed, position.

Device 300 further includes a fastener 334 which is adapted to selectively retain lens 316 adjacent the face, such as in the closed position shown in FIG. 6. When fastener 334 is disengaged, it frees the lens to pivot away from the face, and spring structure 328 automatically pivots the lens away from the face, such as to the second position shown in FIGS. 7 and 8. Fastener 334 may include any conventional linkage capable of retaining lens 316 in the closed position and being selectively disengaged to free the lens to be pivoted away from the face. Therefore, fastener 334 must provide a retaining force that is greater than the force of spring structure 328 when the lens is in the closed position.

One suitable embodiment of fastener 334 is shown in FIGS. 7 and 8. Fastener 334 includes a clasp 336, which extends from perimeter 318 of lens 316. As shown, clasp 336 extends from a position on perimeter 318 that is generally opposed to hinge 320, although it should be understood that other placements of clasp 336 are possible. Clasp 336 has a hooked, or curved, cross-sectional configuration with a terminal end 338 and is adapted to engage and be retained upon a receiver 340 on housing 306.

Receiver 340 includes a detent 342 mounted on a slidable shaft 344. In the closed position shown in FIG. 10, clasp 336 is engaged with receiver 340 by terminal end 338 extending sufficiently around detent 342 to retain the clasp and receiver in engagement with each other and thereby prevent lens 316 from being pivoted away from face 304. Detent 342 is biased to remain in the position shown in FIG. 7, although it is slidable into housing 306 when actuated, as discussed below. When clasp 336 is engaged with detent 342, the terminal end of clasp 336 may deform slightly to allow end 338 to extend around detent 342. Also, detent 342 may be urged at least partially within housing 306 to enable end 338 to be positioned in the closed position.

To disengage fastener 336, detent 342 is slid out of engagement with terminal end 338. Once end 338 is released from engagement with detent 342, spring structure 320 is able to pivot lens 316 away from face 304 so that lens 316 may be used to magnify objects other than the face of the watch. As shown in FIG. 11, terminal end 338 is shaped to engage detent 342 when in the closed position, but not to engage shaft 344. This enables the lens to pivot away from the face, such as to the second position, without end 338 engaging or being retained by shaft 344.

As perhaps best seen in FIGS. 8 and 9, fastener 334 further includes a push-button mechanism 346 that enables the user to selectively actuate the fastener to disengage the fastener and free lens 316 to be pivoted away from face 304. Mechanism 346 is operatively connected to detent 342 via shaft 344 and includes a button 348 that extends from housing 306. When button 348 is depressed, as shown in FIG. 9, detent 342 is slid out of engagement with end 338, and fastener 334 is thereby disengaged. It should be understood that other suitable release mechanisms may be used, such as conventional pivotal release mechanisms, frictional release mechanisms, etc.

Figure 12:
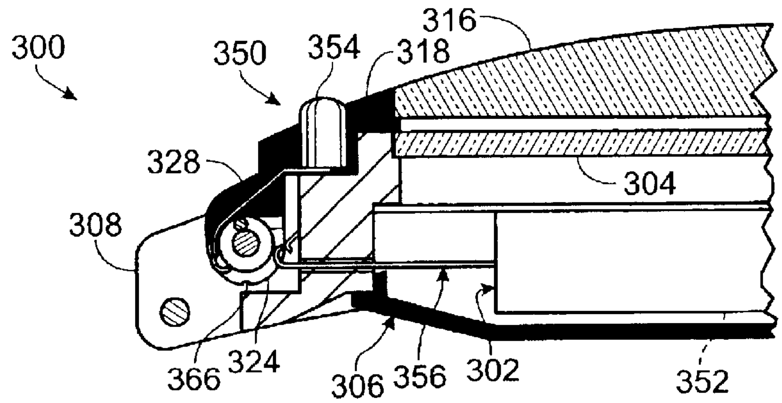
FIG. 12 is a fragmentary cross-sectional view of the device of FIG. 6 with a light.
Figure 13:
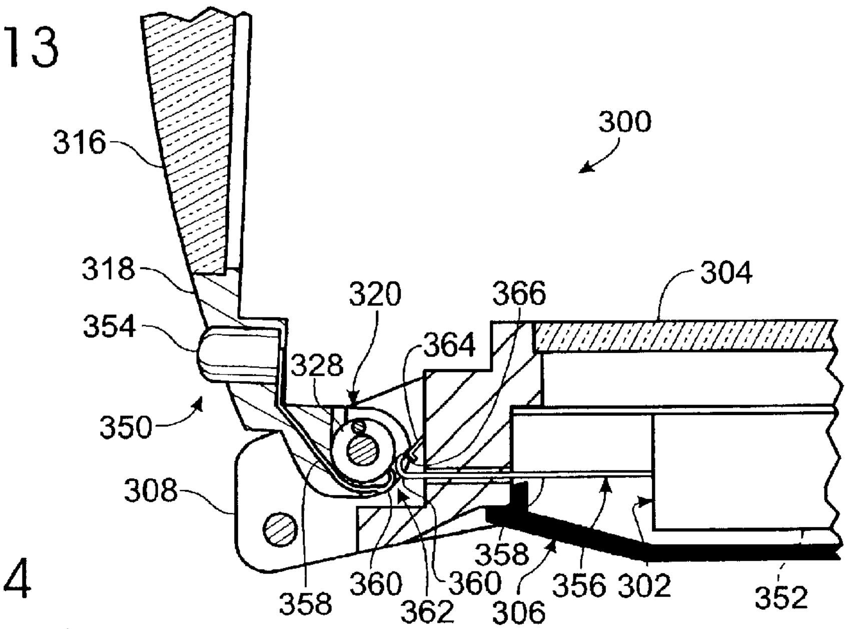
FIG. 13 is the fragmentary cross-sectional view of FIG. 12, with the lens pivoted away from the face to an intermediate position.
Figure 14:
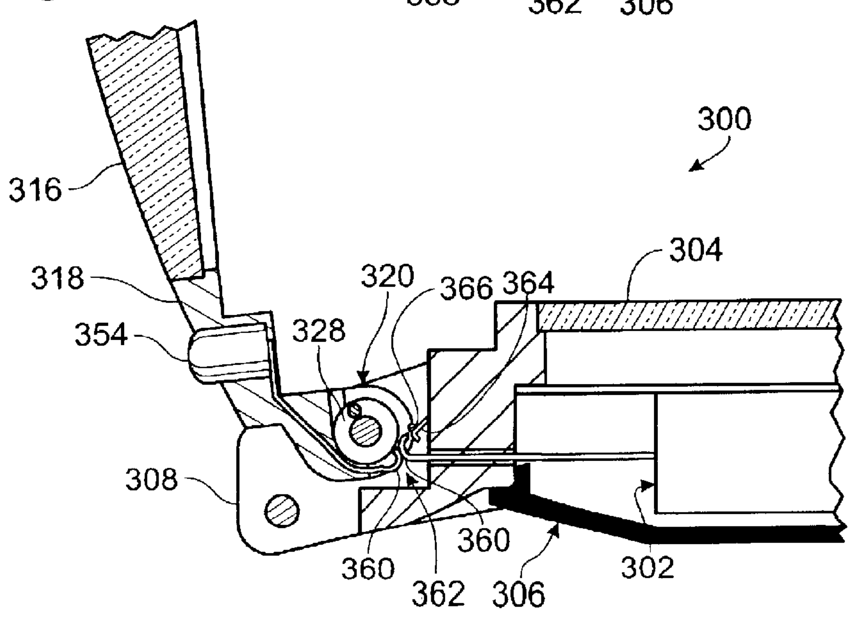
FIG. 14 is the fragmentary cross-sectional view of FIG. 12, with the lens pivoted away from the face to a second position.

Device 300 may further include a light 350, as shown in FIGS. 12–14, which illuminates objects viewable through the lens when the lens is pivoted away from the face. Light 350 includes a power source 352, such as a battery, which provides power to the light. Power source 352 may be the same power source used by watch 302, as indicated in FIGS. 12–14, or it may be independent of the power source used by watch 302.

Light 350 further includes a light source 354, which is positioned to shine light generally normal to the plane of lens 316, as defined by perimeter 318. In contrast to other lights which may be included with the device to illuminate the face of the watch so that a user may view the face in dark environments, light 350 is positioned to illuminate objects that a user views through the lens when the lens is pivoted away from the face of the watch, such as to the second position. Therefore, the light source is positioned to direct its light at objects, or in an area, external the watch and generally normal to the plane of the lens. As shown, light source 354 is mounted on, or housed within, perimeter 318 of lens 316. Light source 354 may vary in color, and may extend directly outwardly from lens 316, or it may be slightly inclined. Alternatively, light source 354 may be mounted on housing 306, although it should be oriented to direct its light generally normal to the plane of the lens when the lens is in the second position. Therefore, it can be seen that mounting light source 354 on lens 316 is preferable because the light source is at all times oriented to direct light to illuminate objects viewed through the lens by the user.

Light source 354 is connected to power source 352 by a wiring system 356, which may be any known system of connecting a power source and a light source for selective transmission of power, such as electrical current, to the light source. As perhaps best seen in FIG. 13, wiring system 356 includes wires 358 that respectively extend from power source 352 and light source 354 and terminate at contacts 360, which are adjacent each other and form a switch 362. It should be understood that power source 352 and light source 354 may be connected by a pair of such wires or wire sets, as is known in the art, or may be directly connected through the housing and/or lens.

When lens 316 is in its closed position, shown in FIG. 12, it can be seen that contacts 360 are spaced-apart from each other. Therefore, switch 362 is open and no power is delivered to the light source. When lens 316 is pivoted to the second position, shown in FIG. 14, however, it can be seen that the rotation of lens 316 about hinge 320 brings contacts 360 into engagement with each other, thereby closing the switch and completing the circuit to actuate light 350. It should be understood that it is within the scope of the present invention that device 300 may additionally or alternatively have a conventional light that is actuated by a user pressing a button, such as disclosed previously. Light 350 is useful because it is automatically illuminated when lens 316 is pivoted to the second position. Therefore, the user does not have to continuously depress a button or other actuation member to use the light.

Because device 300 will often be used in situations where there is sufficient external light to illuminate the objects to be viewed through the lens, lens 316 may be pivoted to an intermediate position that is generally between the first and the second positions, such as shown in FIG. 13. Furthermore, this intermediate position enables the power source to be conserved because it is only used to illuminate light source 354 when the user intends to do so. Typically, intermediate position will be between approximately 70° and 110° away from face 304, preferably between approximately 80° and approximately 100°, and more preferably between approximately 85° and approximately 95° away from face 304. It should be understood, however, that the intermediate position will always be within a range bounded by the closed position and the second position.

To selectively retain lens 316 in the intermediate position, device 300 further includes a pawl 364 that extends from housing 306 to selectively engage a stop 366 on hinge 320, such as on mount 324. When the lens is in the closed position, shown in FIG. 12, and the fastener is disengaged, spring structure 328 automatically pivots lens 316 away from face 304. As lens 316 is pivoted away from the face, stop 366 is rotated towards pawl 364. When lens 316 reaches the intermediate position, shown in FIG. 13, pawl 364 engages stop 366 and prevents the spring structure from pivoting the lens further away from the face of the watch. In the intermediate position, contacts 360 are not engaged with each other, and therefore the light is not actuated. If the user wants to use light 350, the user simply pivots lens 316 further away from face 304, thereby disengaging pawl 364 and stop 366, to the second position shown in FIG. 14, in which the contacts are engaged with each other to complete the circuit and actuate the light. Device 300 may include a pair of pawls 364 extending from housing 306 and a pair of stops 366, one on each mount 324.

It should be understood that device 300 may be constructed without spring structure 328, in which case the user would have to manually pivot the lens away from the face of the watch. Nonetheless, the user would still be able to selectively use the light by pivoting the lens to the intermediate or the second positions.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A timekeeping and magnifying device, comprising:

a watch having a face and a housing adjacent the face, wherein the housing includes generally opposed end regions;

a band coupled to the generally opposed end regions of the housing and adapted to retain the device on a user's wrist;

a magnifying lens coupled to the watch;

a hinge pivotally connecting the magnifying lens and the watch and adapted to enable pivotal movement of the lens away from the face of the watch; and a light having a power source, a light source oriented to illuminate an area external the watch, and a wiring system connecting the power source to the light source, wherein the wiring system includes a normally open switch that may be selectively closed to complete an electrical circuit between the power source and the light source, and thereby actuate the light.

2. The timekeeping and magnifying device of claim 1, wherein pivoting the lens a predetermined distance away from the face of the watch closes the switch, thereby actuating the light.

3. A timekeeping and magnifying device of claim 2, wherein the magnifying lens includes a perimeter region, and the light source is mounted on the perimeter region.

4. The timekeeping and magnifying device of claim 2, wherein the light is mounted on the housing.

5. The timekeeping and magnifying device of claim 2, wherein the lens is pivotal to an intermediate position that is pivotally closer to the face of the watch than the predetermined distance, and further wherein in the intermediate position the switch remains open and the lens may be used to magnify objects other than the face of the watch.

6. The timekeeping and magnifying device of claim 5, wherein the device further includes a stop for selectively retaining the lens in the intermediate position.

7. The timekeeping and magnifying device of claim 5, wherein the intermediate position is between approximately 80° and approximately 100° away from the face.

8. The timekeeping and magnifying device of claim 1, wherein the lens is adapted to be retained generally adjacent the face of the watch when the lens is not pivoted away from the face of the watch, and further wherein the device further includes a fastener that selectively retains the lens adjacent the face of the watch and a spring structure biased to pivot the lens away from the face, wherein disengagement of the fastener enables the spring structure to automatically pivot the lens away from the face.

9. The timekeeping and magnifying device of claim 8, wherein the device further includes a push-button mechanism operatively connected to the fastener, wherein actuation of the push-button mechanism disengages the fastener, thereby enabling the spring structure to pivot the lens away from the face.

10. A timekeeping and magnifying device, comprising:

a watch having a face;

a magnifying lens positioned adjacent the face;

means for connecting the magnifying lens with the watch and selectively allowing the lens to be moved away from the watch so that a user may use the magnifying lens to magnify objects other than the face of the watch; and means for illuminating objects viewed through the magnifying lens.

11. The timekeeping and magnifying device of claim 10, further comprising switch means for selectively actuating the means for illuminating objects viewed through the magnifying lens.

* * * * *